Patented Dec. 14, 1943

2,336,605

UNITED STATES PATENT OFFICE 2,336,605

PESTICIDE

Maurice L. Ernsberger and John F. Lontz, Wilmington, Del., assignors to E. I. du Pont de Nemours & Company, Wilmington, Del., a corporation of Delaware No Drawing. Application December 29, 1941,
Serial No. 424,822

14 Claims. (Cl. 167—22)

This invention relates to pest control compositions, i. e., compositions for the control of bacteria, fungi (including molds), insects, etc.

The number of bactericidal, fungicidal, insecticidal, etc., compositions is great, but the ever increasing number of new compositions of this class indicates that many of these have inherent disadvantages. Thus, many bactericides are rendered inactive by body fluids and especially by blood and blood serum. Also, a number of widely used bactericides contain heavy metals such as mercury, the presence of which is a distinct disadvantage, first because of the known tendency of heavy metals to produce kidney damage and secondly because of the dermatological idiosyncrasies shown by many individuals towards such metals.

This invention has as an object the preparation of compositions having good bactericidal activity which is at least effectively retained in the presence of body fluids. A further object is the provision of bactericides not dependent for their activity on the presence of heavy metal atoms. Another object is the preparation of compositions useful as insecticides and fungicides. Other objects will appear hereinafter.

These objects are accomplished by the invention of compositions for the control of economically and physiologically harmful lower forms of life, containing as an active ingredient a linear polymer characterized by the recurrence, as integral chain members, of guanidine salt groups.

Linear polymeric hexamethyleneguanidine hydrobromide

where $x$ is the number of recurring units in the polymer and is a number greater than 1, has high bactericidal activity, even in the presence of body fluids such as blood serum. Other polymeric guanidine salts have similar action, although there are variations in the degree of activity exhibited by the various members of this series. The polymers having pesticidal activity are formulated as follows:

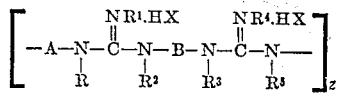

where A and B are bivalent hydrocarbon radicals or hydrocarbon radicals interrupted by ether oxygen of at least four chain atoms, R, $R^1$, $R^2$, $R^3$, $R^4$, and $R^5$ are hydrogen or low molecular weight monovalent hydrocarbon groups (of up to seven carbon atoms), X is the anion of an organic or inorganic acid of dissociation constant at least $1 \times 10^{-7}$, and $z$ is a whole number greater than 1.

The polymeric guanidine salts may be prepared by the procedures described in Bolton, Coffman and Gilman, Serial No. 325,232, filed March 21, 1940.

A very convenient method of preparation is by the reaction of bromcyanogen with a diamine. The polymers may also be prepared by heating together a diamine and an S,S'-dialkyl diisothiourea. Examples A, B, and C below illustrate the preparation of the polymeric salts.

Example A—Preparation of polymeric hexamethyleneguanidine hydrobromide

To a solution of 116 parts of hexamethylenediamine in 500 parts of ethyl alcohol is added dropwise 106 parts of cyanogen bromide in 300 parts of absolute alcohol. A vigorous reaction occurs during this addition. The mixture is then refluxed 25 hours, then concentrated to dryness. The residue is a white powdery solid soluble in water and in alcohol. The yield is 210 parts. Analysis: Calc. for $C_7H_{15}N_3 \cdot HBr$: N, 18.92; found: N, 18.06.

Example B—Preparation of polymeric p-phenylenediethyleneguanidine hydrobromide To a solution of 164 parts of p-bis(beta-aminoethyl)-benzene in 500 parts of ethyl alcohol is added dropwise 106 parts of cyanogen bromide. A vigorous reaction takes place during this addition. The mixture is refluxed for 24 hours and the product is then removed by filtration of the reaction mixture. The yield is 260 parts of a white powdery product. This material is slightly soluble in alcohol and water and is insoluble in ether and benzene.

Example C—Preparation of N,N'-hexamethylene-N,N'decamethyleneguanidine

A mixture of 230 parts of S,S'-dimethyl-N,N'-hexamethylene diisothiourea and 172 parts of decamethylenediamine is heated at 140° for one hour. The product is a light yellow solid soluble in alcohol and in dilute acid. The yield is 290 parts. This polymeric guanidine is readily converted to a water soluble salt by neutralization with an equivalent amount of acid (286 parts of 6 N-hydrochloric acid).

The more detailed practice of the invention is illustrated by the following examples, wherein parts given are by weight. There are of course many forms of the invention other than these specific embodiments.

*Example I—Bactericidal activity of polymeric hexamethyleneguanidine hydrobromide*

These tests are carried out against Staphylococcus aureus by the standard FDA (Food and Drug Administration) method. The results of the tests are shown below:

| Time in contact with culture | Dilution of polymeric guanidine salt | | | |
| --- | --- | --- | --- | --- |
| | 1:2000 | 1:5000 | 1:10,000 | 1:20,000 |
| 5 minutes | − | − | + | + |
| 10 minutes | − | − | ± | + |
| 15 minutes | − | − | − | + |

(A plus sign means the organism was not killed, a minus sign means the organism was killed.)

Tests carried out on Staphylococcus aureus in the presence of 10% horse serum are shown below:

| Time in contact with culture | Dilution of polymeric guanidine salt | | | |
| --- | --- | --- | --- | --- |
| | 1:2000 | 1:5000 | 1:10,000 | 1:20,000 |
| 5 minutes | − | − | + | + |
| 10 minutes | − | − | ± | + |
| 15 minutes | − | − | − | + |

Thus, it is seen that polymeric hexamethyleneguanidine hydrobromide kills Staphylococcus aureus at dilutions of 1:10,000 in 10 minutes. The presence of blood serum does not reduce the bactericidal activity.

Tests with 10% citrated human blood added to the culture of Staphylococcus aureus:

| Time in contact with culture | Dilution of polymeric guanidine salt | | | | |
| --- | --- | --- | --- | --- | --- |
| | 1:500 | 1:1000 | 1:2000 | 1:5000 | 1:10,000 |
| 5 minutes | − | − | − | + | + |
| 10 minutes | − | − | − | + | + |
| 15 minutes | − | − | − | + | + |
| 30 minutes | − | − | − | − | + |

Thus, it is seen that polymeric hexamethyleneguanidine hydrobromide shows bactericidal activity even in the presence of human blood.

*Example II—Bacteriostatic activity of polymeric hexamethyleneguanidine hydrobromide*

Bacteriostatic tests against Staphylococcus aureus in which the growth of the organism was measured in 10 cc. of broth to which were added varying amounts of polymeric hexamethyleneguanidine hydrobromide are shown below:

| Medium | Time of contact | Cc. of 1:1000 aqueous solution of polymeric hexamethyleneguanidine hydrobromide added to 10cc. broth | | |
| --- | --- | --- | --- | --- |
| | | 0.75 | 0.5 | 0.3 |
| | *Days* | | | |
| Plain broth | 1 | − | − | + |
| Do | 2 | − | − | + |
| 10% blood broth | 1 | − | + | + |
| Do | 2 | − | + | + |

(A plus sign indicates growth of the organism and a minus sign indicates failure of growth.)

Thus, this polymer shows bacteriostatic activity at dilutions of 1:20,000 in plain broth and at dilutions of 1:13,000 in 10% blood broth.

In the standard agar cup plate test the effect of the chemical is tested by measuring in millimeters the inhibition of growth of Staphylococcus aureus culture under the influence of various dilutions of test compounds. Such tests are shown below:

| Composition of medium | Dilution of polymeric hexamethyleneguanidine hydrobromide | | |
| --- | --- | --- | --- |
| | 1:100 | 1:1000 | 1:5000 |
| | (Diameter of growth inhibition) | | |
| | *Mm.* | *Mm.* | *Mm.* |
| Plain agar | 3 | 1 | 0 |
| 10% horse serum | 4 | 1 | 0 |
| 50% horse serum | 3 | 2 | 1 |
| 10% human blood | 5 | 3 | 0 |
| 50% human blood | 4 | 2 | 1 |

The minimum lethal dose of polymeric hexamethyleneguanidine hydrobromide which kills 50% of the animals when injected intraperitoneally in mice is found to be 35 mg./kg.

The invention is generic to the use for the control of economically and physiologically harmful lower forms of life of compositions containing as an active ingredient a linear polymer of the formula

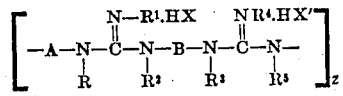

having the guanidine groups as the only salt forming groups, where A and B are bivalent hydrocarbon radicals or hydrocarbon radicals interrupted by ether oxygen which are of at least four chain atoms, X and X' are anions of organic or inorganic acids of ionization constant (25° C.) of at least $1 \times 10^{-7}$, $z$ is a whole number greater than 1, and R, $R^1$, $R^2$, $R^3$, $R^4$, and $R^5$ are hydrogens or monovalent hydrocarbon groups of up to seven carbon atoms. A and B are preferably bivalent hydrocarbon radicals of at least four chain atoms. The preferred compounds are those in which A and B are the same polymethylene and ether interrupted polymethylene chains preferably of from 6 to 12 carbon atoms, where R, $R^1$, $R^2$, $R^3$, $R^4$, and $R^5$ are hydrogen and X and X' are the same anion of a strong inorganic acid (having an ionization constant of at least $1 \times 10^{-3}$). These compounds are useful as pesticides and are especially useful as bactericides. A and B (which may be alike or different) may be, for example, tetramethylene, pentamethylene, hexamethylene, decamethylene, dodecamethylene, octadecamethylene, p-phenylenediethylene, p-methylenediphenylene, p-phenylenedimethylene, p-phenylene, oxydiethylene ($-CH_2CH_2OCH_2CH_2-$), dioxytriethylene ($-CH_2CH_2OCH_2CH_2OCH_2CH_2-$)

etc. While these hydrocarbon and ether interrupted hydrocarbon connecting members are preferred because of their availability, for the purposes of this invention, any inert connecting member is effective and is, for the purposes of the invention essentially equivalent to a hydrocarbon or ether interrupted hydrocarbon connecting member. Thus, A and B may be unsaturated hydrocarbons, and they may also contain atoms or atomic groupings inert toward the guanido groups and the reagents used in preparing the polymers, such as in addition to ether oxygen, —S—, —S—S—, —SO—, —SO$_2$—, —CONH—, —CON-hydrocarbon—, —COO—, etc. Examples of radicals containing these atoms or atomic groups are, for example,

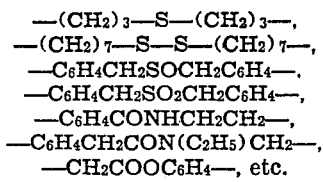

The most common of these groups, and consequently those which are preferred for economical reasons, are the thioether sulfur, amido and ester groups.

The various R's in the general formula above preferably represent hydrogen, although they may also be monovalent hydrocarbon radicals of up to seven carbon atoms, such as methyl, ethyl, propyl, isopropyl, butyl, cyclohexyl, hexyl, heptyl, phenyl or benzyl.

X and X' are preferably the anions of halogen acids, preferably hydrochloric and hydrobromic acids. However, they may also be the anions of other inorganic acids such as sulfuric, phosphoric, nitric acids, etc., or of organic acids such as acetic, chloracetic, benzoic, citric, oxalic, succinic acids, etc. The dissocation constant of the acid should be at least $1 \times 10^{-7}$.

The products are useful in the control of, i. e., useful in either killing or repelling, insect pests such as codling moths, Japanese beetles, Mexican bean beetles, carpet beetles, red spiders, aphids, citrus red mite, flies, moths, moth larvae, ticks, fleas, and the like. The products are also useful in the control of molds such as *Aspergillus niger*, Penicillium, lumber mold, and tricophyton. The products show bactericidal activity against both Gram-positive and Gram-negative organisms such *B. typhosis, Staphylococcus aureus, Streptococcus hemolyticus*, pneumococci, *B. coli*. The guanidine salts may also be used to control protozoans such as the amoeba.

The polymeric guanidine salts may be used in combination with inert ingredients as compositions for the control of harmful insect pests, molds, and bacteria. The products may be formulated in mixtures with inert ingredients such as talc, calcium carbonate, tricalcium phosphate, bentonite or the like. The products may also be employed in solution in aqueous or in organic solvents such as alcohol, or as dispersions in water or in organic liquids such as acetone. The concentration of polymeric guanidine salts in such compositions may vary from .01% to values as high as 50% of the active ingredient.

The polymeric guanidine salts may be employed as the active ingredient in sprays for the control of insects, mold, and bacteria. Thus a mixture of 10 parts of polymer, 75 parts of tricalcium phosphate, and 5 parts of bentonite, when used at a concentration of 4 pounds per 100 gallons of water may be used as a spray for the control of such insects as bean beetles, Japanese beetles, and codling moths, as well as for the control of mold and bacterial growth.

The compounds may also be used as dusting powders for the control of insects. For this purpose an aqueous solution of polymer can be made into a thick paste with talc which on drying and grinding to a fine powder yields a composition useful in the control of such insects as bean beetles, fleas, ticks, and the like.

The polymers may be used in combination with other active ingredients such as metallic arsenicals, fluosilicates, organic thiocyanates, phenothiazine, nicotine, rotenone, pyrethrum, isobutyl-undecylenamide, and these mixtures may be further diluted with inert ingredients such as talc, or they may be dissolved or suspended in such solvents as kerosene, water, or alcohol. Dispersing agents such as lauryl alcohol, long chain alcohol sulfates, sulfonated oils and the like may be used to aid in stabilizing the suspension. These compositions are useful for the control of flies, moths and other insect pests.

The polymers may also be incorporated with fungicidally active ingredients such as propionates, Bordeaux mixture, Burgundy mixture, copper chelates of salicylaldehyde, copper chelates of beta-keto esters, copper derivatives of ethyl acetoacetate, butenedioic esters, and cyclic aminomethyl sulfides, etc. These polymers or their combinations with other active ingredients may be used to impregnate cellulosic wrapping materials to aid in retarding mold growth.

The polymers may be used as agents for preserving wool, fur, silk, cellulose, regenerated cellulose, leather, cotton, glue, and paper from the action of harmful pests, particularly molds, moths, and bacteria. The polymers may be applied to these materials directly or they may be applied from solution in aqueous or organic solvents. They may be used as coatings or they may be used as dusting powders in combination with talc.

The compounds may be employed as bactericides in aqueous solution as alcoholic tinctures, in the presence of an inert ingredient such as soap, and in combination with other bactericidally active materials such as phenol, alkyl resorcinols, organic mercurials, long chain quaternary ammonium salts and the like.

The solution of the polymeric salts in water or organic solvents may be used for sterilization of the skin, for the sterilization of instruments or garments, and the disinfection of wounds. The products may also be used as the active ingredient in mouth washes and disinfectant soaps. The free polyguanidine bases are not appreciably soluble in water so that in general the salts thereof are used.

The above description and examples are intended to be illustrative only. Any modification of or variation therefrom which conforms to the spirit of the invention is intended to be included within the scope of the claims.

What is claimed is:

1. Process for controlling bacteria, fungi and insects which comprises bringing the same in contact with a composition containing as an active ingredient a linear polymeric guanidine salt in which the multiply recurring linear polymeric unit comprises at least fourteen chain atoms of which six are in two guanidine salt groups which are separated by radicals of at least four chain atoms joined to the guanidine salt groups thru carbon and selected from the class consisting of bivalent hydrocarbon and ether interrupted hydrocarbon radicals.

2. Process for controlling bacteria, fungi and insects which comprises bringing the same in contact with a composition comprising as an essential active ingredient a linear polymeric guanidine salt having the formula

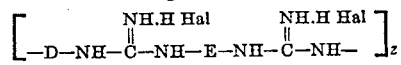

wherein D and E are hydrocarbon radicals of at least four chain carbons, Hal is a halogenide anion and z is an integer greater than one.

3. Process of claim 1 wherein the salt is of an acid having an ionization constant of at least $1 \times 10^{-3}$.

4. Process for controlling bacteria, fungi and insects which comprises bringing the same in contact with a composition comprising as an essential active ingredient a linear polymeric guanidine salt having the formula

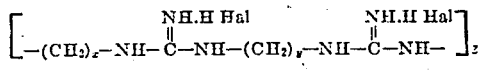

wherein $x$ and $y$ are integers not less than four, Hal is a halogenide anion and $z$ is the number of recurring units in the polymer and is an integer greater than one.

5. Process of claim 4 wherein $x=y$.

6. Process of claim 4 wherein $x=y=6$ to 12.

7. Process for controlling bacteria which comprises bringing the same in contact with a composition containing as an essential active ingredient a linear polymeric guanidine salt of the formula

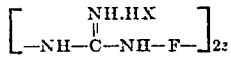

wherein $z$ is an integer greater than one, F is a polymethylene chain of at least four atoms and X is the anion of an acid having an ionization constant of at least $1 \times 10^{-7}$.

8. Process for controlling bacteria, fungi and insects which comprises bringing the same in contact with a composition comprising as an essential active ingredient a linear polymeric guanidine salt having the formula

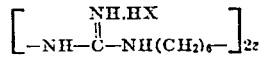

wherein $z$ is an integer greater than one and X is the anion of an acid having an ionization constant of at least $1 \times 10^{-3}$.

9. Process for controlling bacteria, fungi and insects which comprises bringing the same in contact with a composition comprising as an essential active ingredient a linear polymeric guanidine salt having the formula

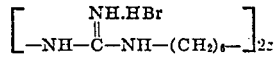

wherein $z$ is an integer greater than one.

10. Process for controlling bacteria, fungi and insects which comprises bringing the same in contact with a composition comprising as an essential active ingredient a linear polymeric guanidine salt having the formula

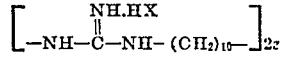

wherein $z$ is an integer greater than one and X is the anion of an acid having an ionization constant of at least $1 \times 10^{-3}$.

11. Process for controlling bacteria, fungi and insects which comprises bringing the same in contact with a composition comprising as an essential active ingredient a linear polymeric guanidine salt having the formula

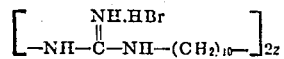

wherein $z$ is an integer greater than one.

12. Process for controlling bacteria, fungi and insects which comprises bringing the same in contact with a composition comprising as an essential active ingredient a linear polymeric N,N'-hexamethylene - N,N'-decamethyleneguanidine salt.

13. Process for controlling bacteria, fungi and insects which comprises bringing the same in contact with a composition comprising as an essential active ingredient a linear polymeric N,N'-hexamethylene - N,N' - decamethyleneguanidine hydrohalide.

14. Process for controlling bacteria, fungi and insects which comprises bringing the same in contact with a composition comprising as an essential active ingredient linear polymeric N,N'-hexamethylene - N,N' - decamethyleneguanidine hydrobromide.

MAURICE L. ERNSBERGER.
JOHN F. LONTZ.

CERTIFICATE OF CORRECTION.

Patent No. 2,336,605. December 14, 1943.

MAURICE L. ERNSBERGER, ET AL.

It is hereby certified that error appears in the printed specification of the above numbered patent requiring correction as follows: Page 1, second column, line 22, for "25 hours" read --24 hours--; and that the said Letters Patent should be read with this correction therein that the same may conform to the record of the case in the Patent Office.

Signed and sealed this 14th day of March, A. D. 1944.

(Seal)

Leslie Frazer
Acting Commissioner of Patents.